United States Patent
Stone et al.

(10) Patent No.: US 11,919,474 B2
(45) Date of Patent: Mar. 5, 2024

(54) HARNESS BUCKLE LOCKING ASSEMBLY

(71) Applicants: Shiann Stone, San Jose, CA (US);
Anderesia Ross, San Jose, CA (US)

(72) Inventors: Shiann Stone, San Jose, CA (US);
Anderesia Ross, San Jose, CA (US)

( * ) Notice: Subject to any disclaimer, the term of this patent is extended or adjusted under 35 U.S.C. 154(b) by 124 days.

(21) Appl. No.: 17/743,542

(22) Filed: May 13, 2022

(65) Prior Publication Data

US 2023/0365100 A1    Nov. 16, 2023

(51) Int. Cl.
| | |
|---|---|
| B60R 22/00 | (2006.01) |
| A44B 11/25 | (2006.01) |
| B60R 21/01 | (2006.01) |
| B60R 22/48 | (2006.01) |
| G07C 5/08 | (2006.01) |

(52) U.S. Cl.
CPC .......... B60R 22/48 (2013.01); A44B 11/2573 (2013.01); B60R 21/01 (2013.01); G07C 5/0808 (2013.01); *B60R 2021/01265* (2013.01); *B60R 2022/4816* (2013.01)

(58) Field of Classification Search
CPC .............. B60R 22/48; B60R 21/01; B60R 2021/01265; B60R 2022/4816; A44B 11/2573; G07C 5/0808
See application file for complete search history.

(56) References Cited

U.S. PATENT DOCUMENTS

| | | | |
|---|---|---|---|
| 5,050,277 A | 9/1991 | JImenez | |
| 6,922,154 B2* | 7/2005 | Kraljic | G08B 21/22 340/687 |
| 8,063,788 B1* | 11/2011 | Morningstar | G08B 21/24 340/439 |
| 8,539,862 B1 | 9/2013 | Robinson | |
| 9,417,078 B1* | 8/2016 | Seibert | G01C 21/26 |
| 9,424,728 B2* | 8/2016 | Rambadt | B60K 28/066 |
| 9,457,716 B2* | 10/2016 | Westmoreland | B60Q 9/00 |
| 9,845,050 B1* | 12/2017 | Garza | G08B 21/0205 |
| 10,053,054 B1* | 8/2018 | Chiang | B60R 22/48 |
| 10,131,318 B2* | 11/2018 | Davis | G08B 21/0266 |
| D841,416 S | 2/2019 | Davison | |
| 10,501,049 B1* | 12/2019 | Rojas Silva | B60R 22/343 |
| 10,737,615 B1* | 8/2020 | Moore | B60R 22/48 |
| 10,752,206 B2* | 8/2020 | Tinoco | B60R 22/48 |
| 11,001,227 B2* | 5/2021 | Davis | G08B 25/08 |
| 11,462,092 B2* | 10/2022 | Sadolfo | G08B 21/22 |

(Continued)

FOREIGN PATENT DOCUMENTS

WO    WO2016195923    12/2016

*Primary Examiner* — Phutthiwat Wongwian
*Assistant Examiner* — Sherman D Manley (57) ABSTRACT

A harness buckle locking assembly for a buckle of for a car seat includes an On-Board Diagnostics (OBD) device, comprises a first transceiver and is configured to operationally engage an OBD II port of a vehicle, and a housing, which is positionable over a release button of a buckle of a car seat. A depressible button is attached to a pin and can be depressed to actuate the release button. A lock unit selectively locks the pin within the housing. An electronics unit is operationally engaged to the lock unit and communicates with the OBD device and with an electronic device of a user. The electronics unit can signal the user of occupancy of the car seat, when the vehicle has been turned off for a preset time, and also can selectively actuate the lock unit to unlock the pin.

13 Claims, 8 Drawing Sheets

(56) References Cited

U.S. PATENT DOCUMENTS

| | | | |
|---|---|---|---|
| 2014/0052342 A1* | 2/2014 | Seibert | B60R 22/105 |
| | | | 701/45 |
| 2016/0166014 A1 | 6/2016 | Soenen | |
| 2016/0362047 A1* | 12/2016 | Moore | B60R 22/48 |
| 2017/0247015 A1* | 8/2017 | Davis | G08B 21/0225 |
| 2018/0249791 A1 | 9/2018 | Riley-Carter | |
| 2020/0269807 A1* | 8/2020 | Tardif | B60N 2/2812 |
| 2021/0024032 A1* | 1/2021 | Edwards | B60R 22/48 |
| 2021/0291730 A1* | 9/2021 | De La Cruz | E05F 15/71 |
| 2022/0234540 A1* | 7/2022 | Barnes | G01L 1/22 |

\* cited by examiner

HARNESS BUCKLE LOCKING ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to locking assemblies and more particularly pertains to a new locking assembly for a buckle of for a car seat. The present invention discloses a locking assembly which prevents a child from pressing the release button of a buckle of a car seat under normal driving conditions but allows the child to press the release button in emergency situations.

(2) DESCRIPTION OF RELATED ART INCLUDING INFORMATION DISCLOSED UNDER 37 CFR 1.97 AND 1.98

The prior art relates to locking assemblies. Prior art locking assemblies may comprise devices for facilitating actuation of release buttons of buckles, which may be manual, force multiplying, or mechanical. What is lacking in the prior art is a locking assembly comprising a device which is engageable to a buckle and which is selectively actuatable under prescribed circumstances to allow the release button to be depressed.

(h) BRIEF SUMMARY OF THE INVENTION

An embodiment of the disclosure meets the needs presented above by generally comprising an On-Board Diagnostics (OBD) device and a housing. The OBD device comprises a first transceiver and is configured to operationally engage an OBD II port of a vehicle. The housing defines an interior space and is configured to selectively attach to a buckle of a harness that is engaged to a car seat, which secured to the vehicle, so that the housing is positioned over a release button of the buckle. A pin is slidably attached to the housing and is selectively extensible from the interior space through a first orifice positioned in a rear facet of the housing. A second orifice is positioned in a front facet of the housing. A depressible button is attached to the pin and extends into the second orifice. The depressible button is configured to be depressed to extend the pin from the housing to actuate the release button of the buckle. A lock unit is attached to the housing, is positioned in the interior space, and is operationally engaged to the pin so that the pin is selectively lockable within the housing.

An electronics unit is positioned in the interior space, is operationally engaged to the lock unit, and is configured to communicate with the OBD device and with an electronic device of a user. The electronics unit is enabled to selectively actuate the lock unit to unlock the pin. The electronics unit is configured for one or more of signaling the user of occupancy of the car seat when the vehicle has been turned off for a preset time and for selectively actuating the lock unit to unlock the pin.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

With reference now to the drawings, and in particular to FIGS. 1 through 10 thereof, a new locking assembly embodying the principles and concepts of an embodiment of the disclosure and generally designated by the reference numeral 10 will be described.

As best illustrated in FIGS. 1 through 10, the harness buckle locking assembly generally comprises an On-Board Diagnostics (OBD) device 12 and a housing 14. The OBD device 12 comprises a first transceiver 16, which may operate at a frequency of from 2.402 to 2.480 GHz, and is configured to be operationally engaged to an OBD II port 18 of a vehicle 20.

Figure 1:
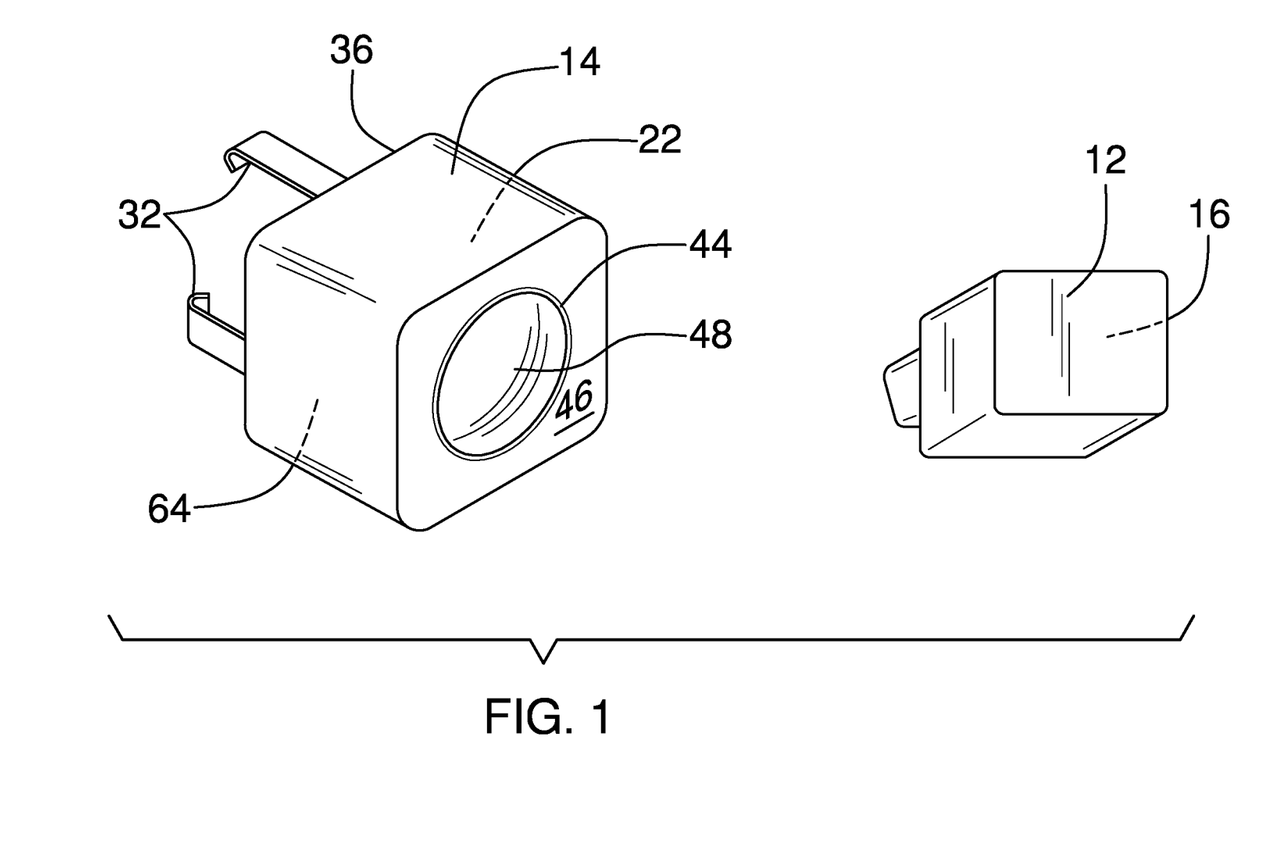
FIG. 1 is an isometric view of a harness buckle locking assembly according to an embodiment of the disclosure.
Figure 2:
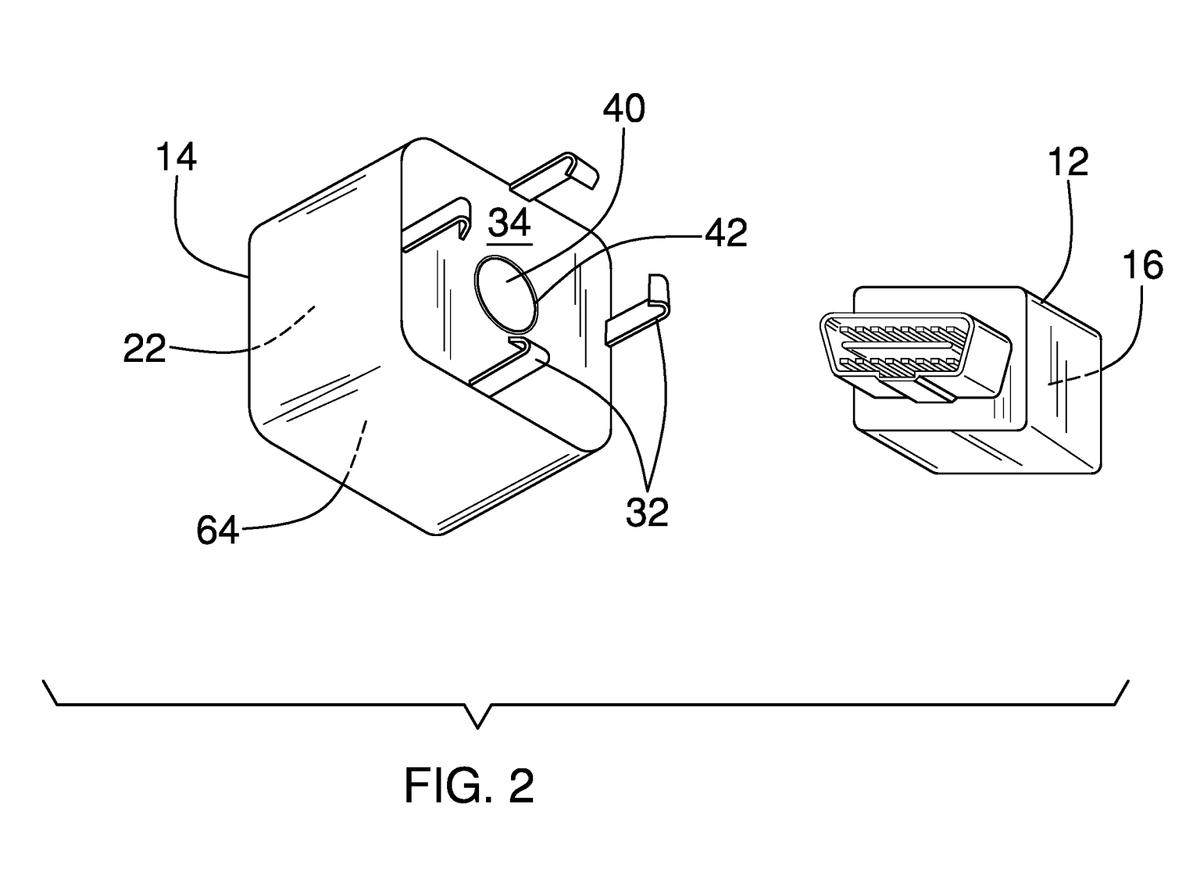
FIG. 2 is an isometric view of an embodiment of the disclosure.
Figure 3:
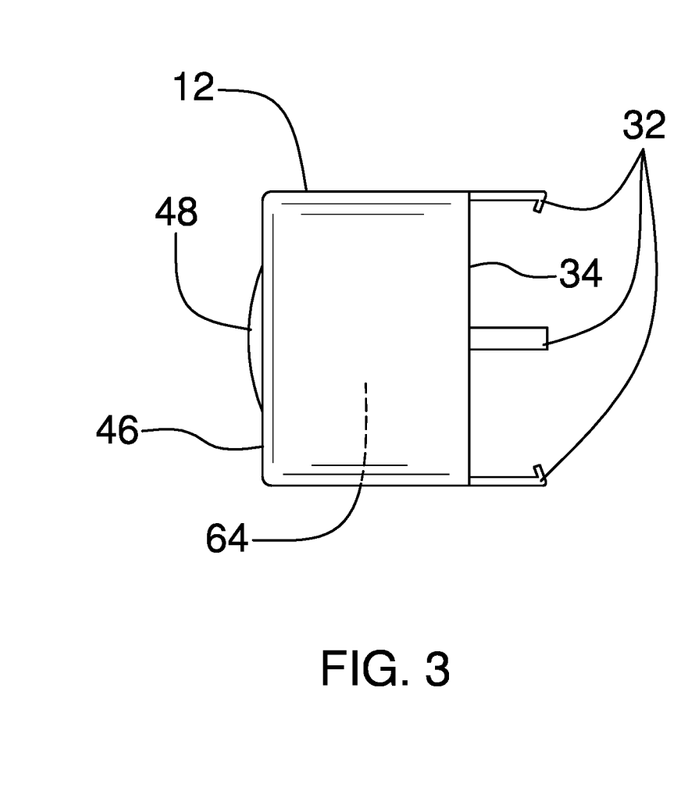
FIG. 3 is a side view of an embodiment of the disclosure.
Figure 4:
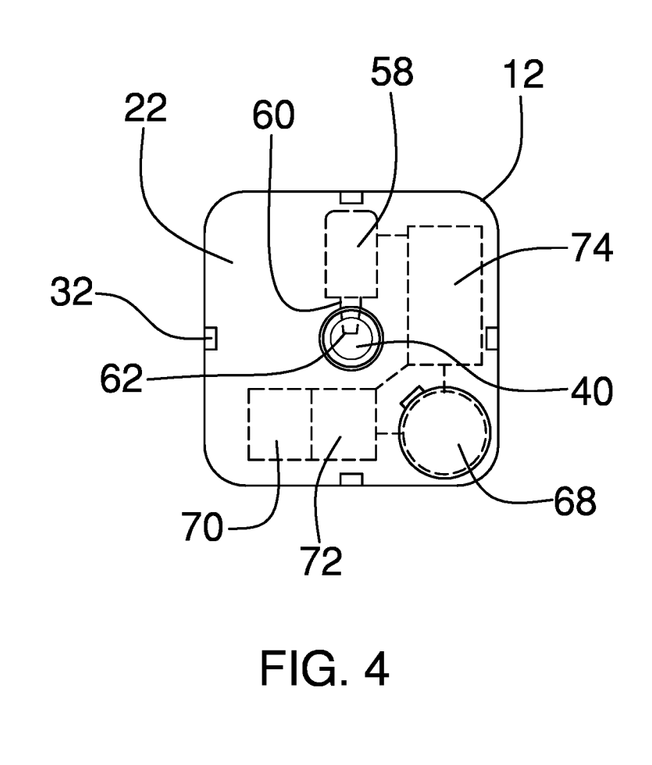
FIG. 4 is a rear view of an embodiment of the disclosure.
Figure 5:
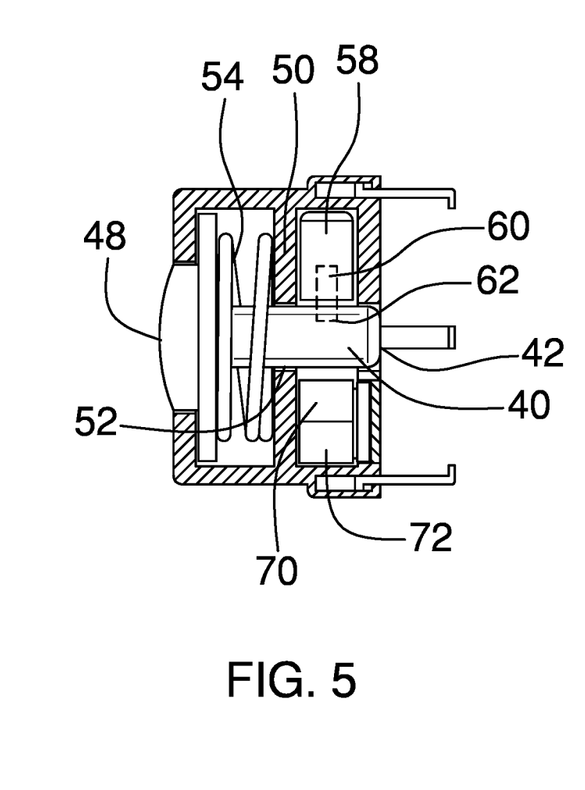
FIG. 5 is a cross-sectional view of an embodiment of the disclosure.

The housing 14, which may be substantially cuboid, defines an interior space 22 and is configured to be selectively attached to a buckle 24 of a harness 26 of a car seat 28, which secured to the vehicle 20. Upon attachment, the housing 14 is positioned over a release button 30 of the buckle 24. A plurality of clips 32 is attached to and extends from a rear facet 34 of the housing 14. The clips 32 are configured to selectively and removably attach the buckle 24 of the harness 26. The plurality of clips 32 may comprise four clips 32, as shown in FIG. 1, with each clip 32 extending from proximate to a respective side 36 of the rear facet 34. A plurality of channels 38 extends into the rear facet 34 of the housing 14, as shown in FIG. 5. Each clip 32 is slidably positioned in and is selectively extensible from a respective channel 38. The plurality of clips 32 thus is configured to attach the housing 14 to buckles 24 having a variety of thicknesses.

Figure 6:
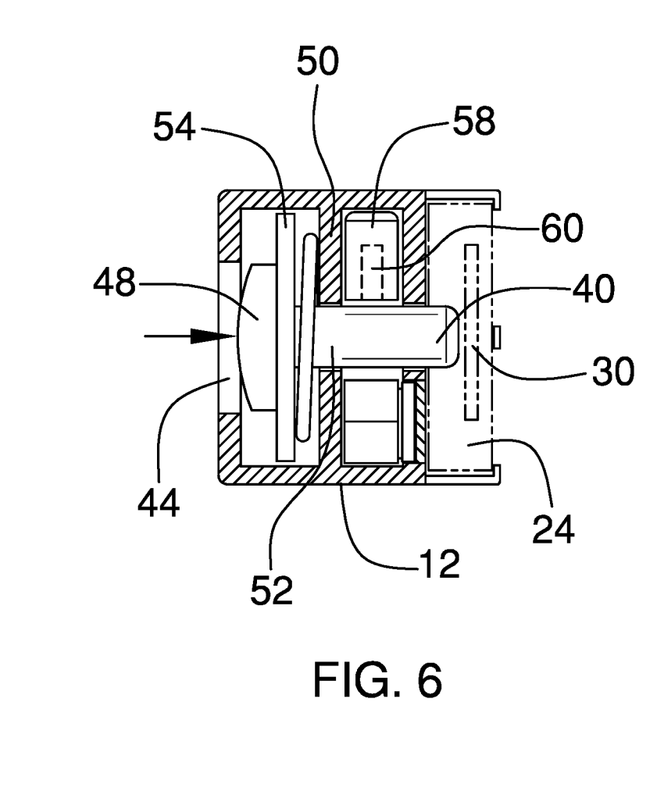
FIG. 6 is a cross-sectional view of an embodiment of the disclosure.

A pin 40 is slidably attached to the housing 14 and is selectively extensible from the interior space 22 through a first orifice 42, which is positioned in the rear facet 34 of the housing 14, as shown in FIGS. 5 and 6. A second orifice 44 is positioned in a front facet 46 of the housing 14. A depressible button 48 is attached to the pin 40 and extends into the second orifice 44. The depressible button 48 is configured to be depressed to extend the pin 40 from the housing 14 to actuate the release button 30 of the buckle 24.

A wall 50 engaged to the housing 14 and is positioned in the interior space 22. The pin 40 extends through a hole 52 in the wall 50. A spring 54 is positioned around the pin 40 between the wall 50 and the depressible button 48. The spring 54 is configured to be compressed upon depressing of the depressible button 48. The spring 54 rebounds upon release of the depressible button 48 to retract the pin 40 into the housing 14.

A lock unit 56 is attached to the housing 14, is positioned in the interior space 22, and is operationally engaged to the pin 40 so that the pin 40 is selectively lockable within the housing 14. The lock unit 56 may comprise a solenoid 58 and a piston 60, or other actuatable locking means, such as, but not limited electric strikes, electromagnetic locks, and the like. The piston 60 is operationally engaged to the solenoid 58 so that the solenoid 58 is positioned to selectively retract the piston 60 from a recess 62 in the pin 40, thereby unlocking the pin 40.

Figure 9:
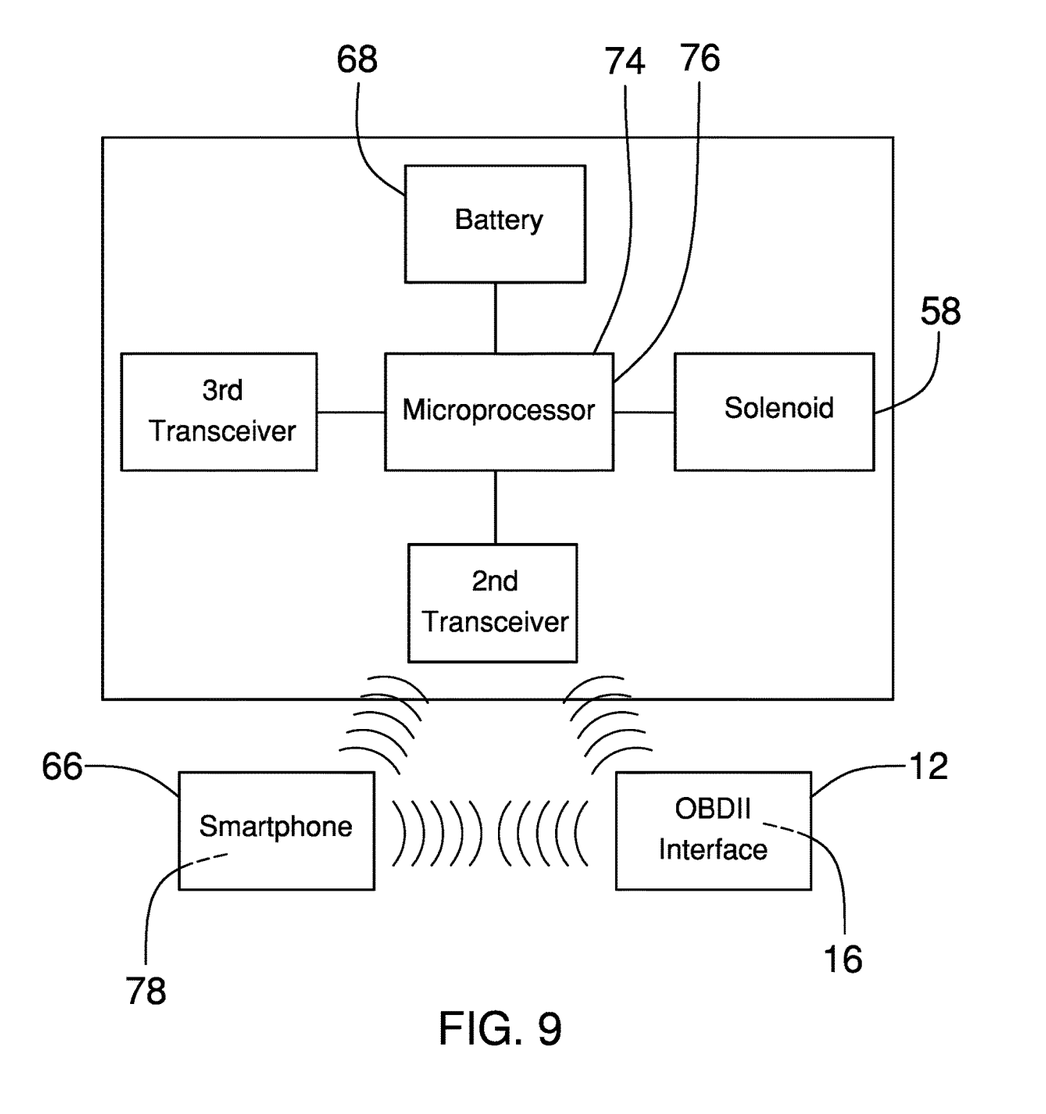
FIG. 9 is a block diagram of an embodiment of the disclosure.

An electronics unit 64 is positioned in the interior space 22, is operationally engaged to the lock unit 56, and is configured to communicate with the OBD device 12 and with an electronic device 66 of a user. The electronics unit 64 is enabled to selectively actuate the lock unit 56 to unlock the pin 40. The electronics unit 64 is configured for one or more of signaling the user of occupancy of the car seat 28 when the vehicle 20 has been turned off for a preset time and for selectively actuating the lock unit 56 to unlock the pin 40.

The electronics unit 64 comprises a battery 68 and a second transceiver 70, which is configured for wireless communication with the electronic device 66 of the user and the OBD device 12. The second transceiver 70 may operate in a frequency range of from 2.402 GHz to 2.480 GHz. The electronics unit 64 also may comprise a third transceiver 72, which is Global Positioning System enabled. The third transceiver 72 is configured to receive coordinates of the housing 14 to determine a location of the housing 14. A microprocessor 74 is operationally engaged to the battery 68, the second transceiver 70, and the third transceiver 72.

Operations programming code 76 is positioned on the microprocessor 74 and enables the microprocessor 74 to actuate the lock unit 56 to unlock the pin 40 after a first preset time, for example, 30 seconds, after the vehicle 20 is in park and the ignition has been turned off under normal working conditions. The operations programming code 76 also enables the microprocessor 74 to actuate the lock unit 56 to unlock the pin 40 after a second preset time, for example, 30 seconds, after air bags of the vehicle 20 have been deployed.

Communications programming code 78 is selectively positionable on the electronic device 66 of the user and enables the electronic device 66 to communicate with the electronics unit 64 and to selectively sound an alarm after communication between the second transceiver 70 and the electronic device 66 of the user has been lost or interrupted for a third preset time, for example, 2 minutes. The operations programming code 76 enables the microprocessor 74 to actuate the lock unit 56 to unlock the pin 40 after a fourth preset time, for example, 3 minutes, after communication between the second transceiver 70 and the electronic device 66 of the user has been lost or interrupted.

Figure 7:
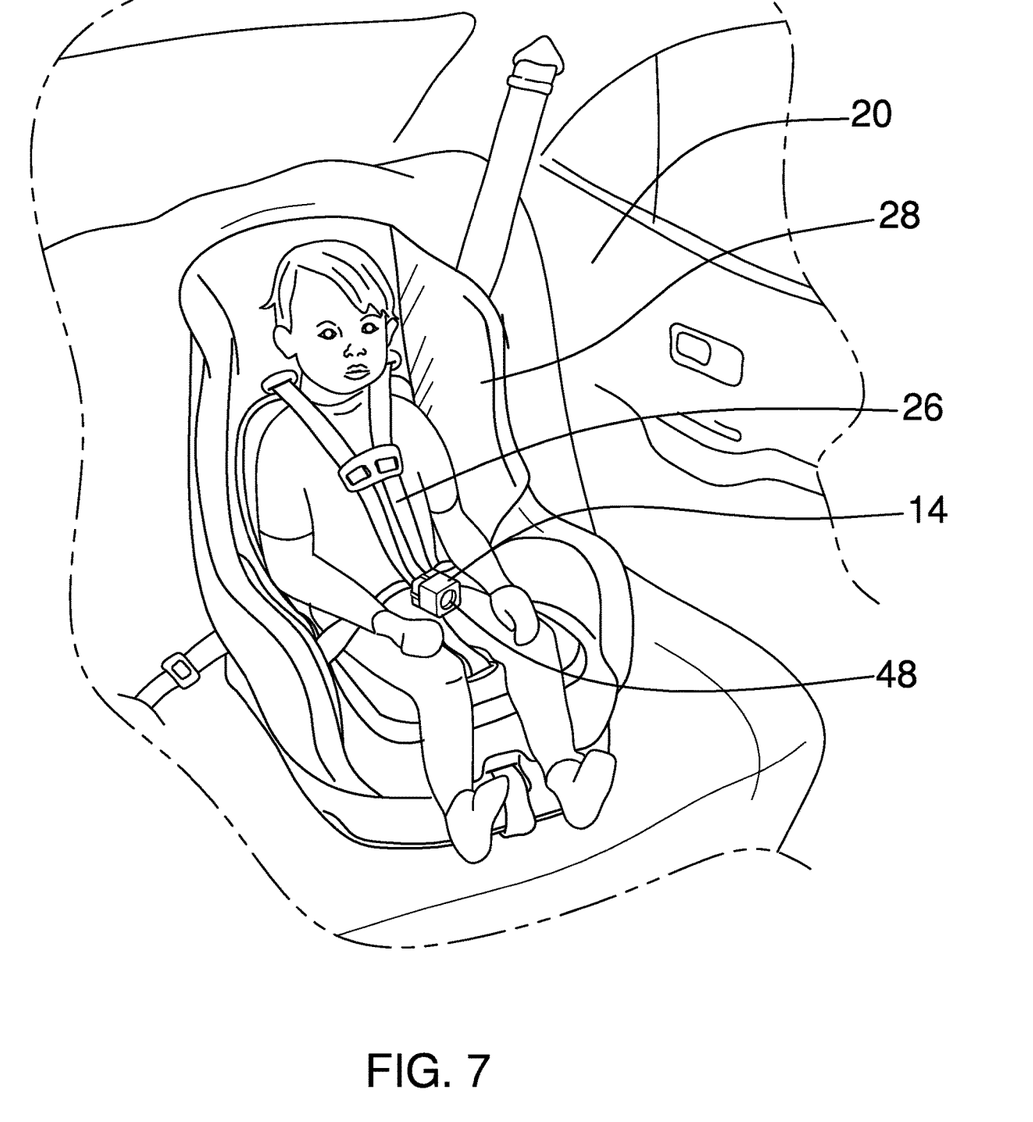
FIG. 7 is an in-use view of an embodiment of the disclosure.
Figure 8:
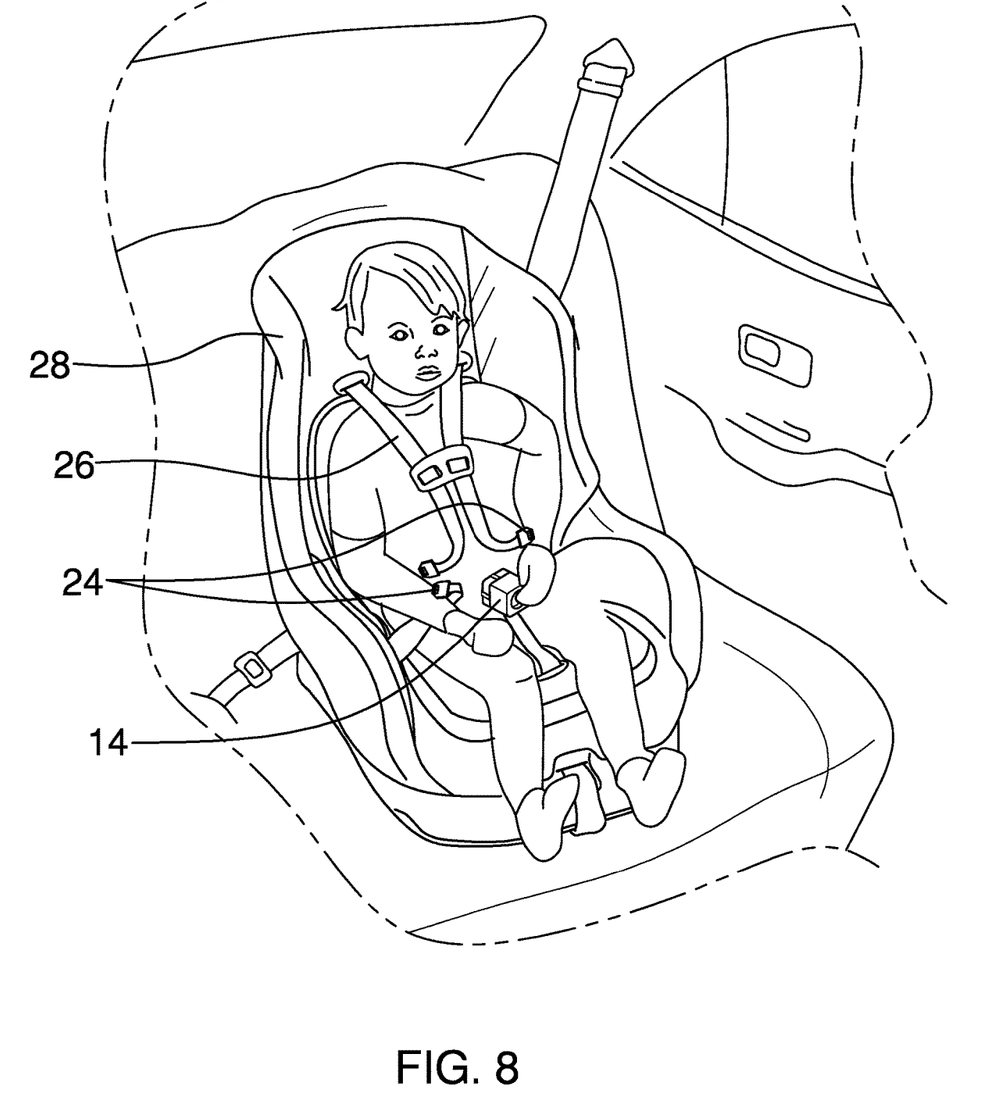
FIG. 8 is an in-use view of an embodiment of the disclosure.
Figure 10:
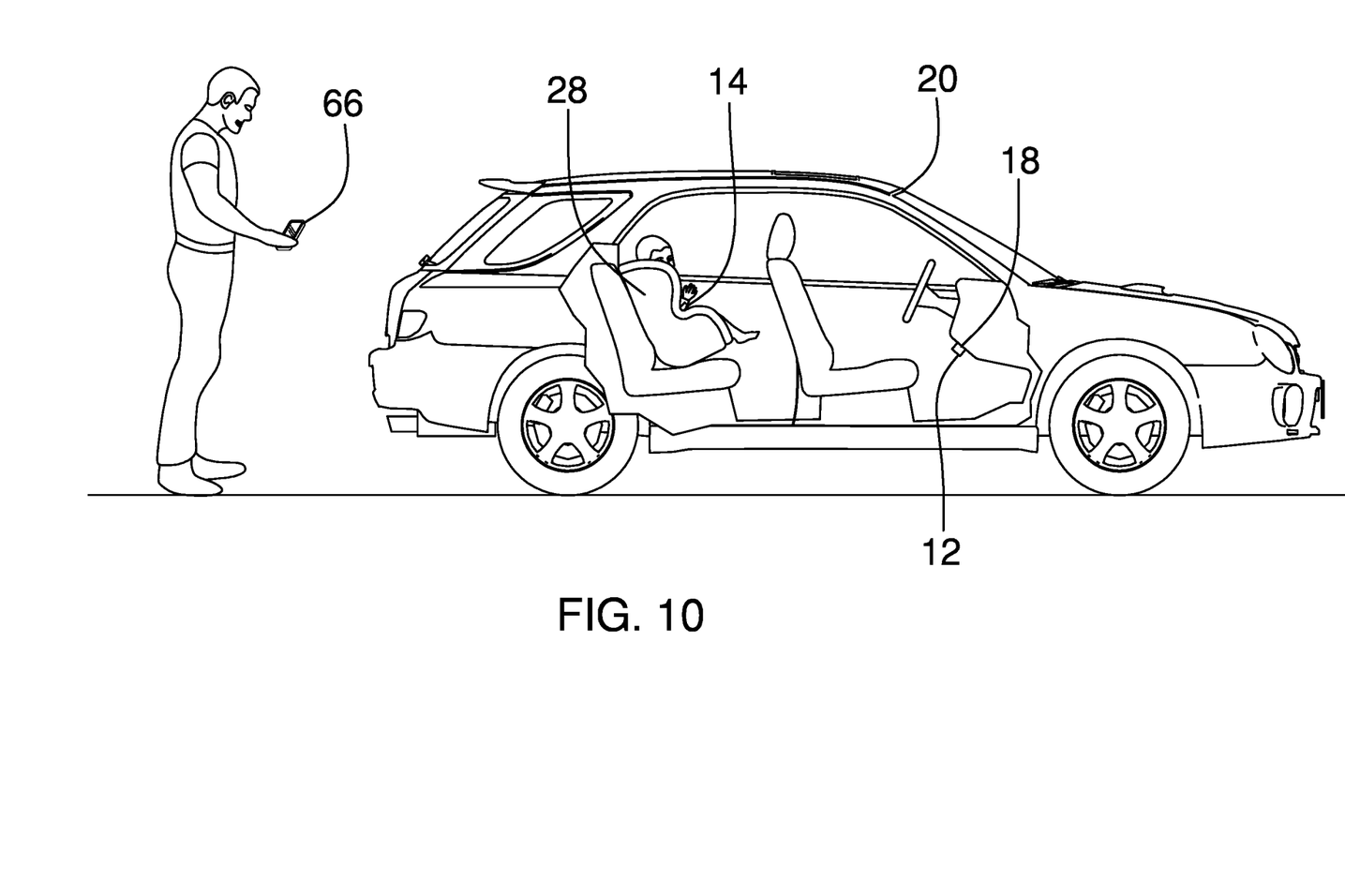
FIG. 10 is an in-use view of an embodiment of the disclosure.

In use, the OBD device 12 is operationally engaged to the OBD II port 18 of the vehicle 20. A child is positioned in the car seat 28 and is buckled in. The housing 14 then is positioned over the release button 30 of the buckle 24 of the car seat 28 and is attached with the clips 32. The lock unit 56 locks the pin 40 within the housing 14, preventing the child from unlocking the buckle 24 while the vehicle 20 is being driven, which accomplishes a first objective of the invention.

A second objective of the invention is to allow the child to unlock the buckle 24 when the car has been positioned in park and the ignition has been turned off. The microprocessor 74 can actuate the lock unit 56 to unlock the pin 40 after a first preset time under these circumstances so that the child has an opportunity to free themselves from a potentially dangerous situation.

A third objective of the invention is to allow the child to unlock the buckle 24 after the airbags of the car have been deployed. The microprocessor 74 can actuate the lock unit 56 to unlock the pin 40 after a second preset time under these circumstances, again offering the child an opportunity to extricate themselves from a potentially dangerous situation and to potentially provide or secure assistance for the user.

A fourth objective of the invention is to allow the child to unlock the buckle 24 after the user has left the vehicle 20 and their electronic device 66 has moved out of communication range with the electronics unit 64. The microprocessor 74 can actuate the lock unit 56 to unlock the pin 40 after a third preset time under these circumstances.

A fifth objective of the invention is to notify the user when the circumstances of the fourth objective occur, and this is accomplished by the communications programming code 78 that is positioned on the electronic device 66 of the user, which would typically be a smartphone. The communications programming code 78 actuates an alarm on the electronic device after a fourth preset time, thereby alerting the user that the child has been left in the vehicle 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A harness buckle locking assembly comprising:
    an On-Board Diagnostics (OBD) device comprising a first transceiver and being configured for operationally engaging an OBD II port of a vehicle;
    a housing defining an interior space and being configured for selectively attaching to a buckle of a harness engaged to a car seat secured to the vehicle, such that the housing is positioned over a release button of the buckle;
    a pin slidably attached to the housing and being selectively extensible from the interior space through a first orifice positioned in a rear facet of the housing;
    a second orifice positioned in a front facet of the housing;
    a depressible button attached to the pin and extending into the second orifice, wherein the depressible button is configured for depressing for extending the pin from the housing for actuating the release button of the buckle;
    a lock unit attached to the housing, positioned in the interior space, and operationally engaged to the pin, such that the pin is selectively lockable within the housing; and
    an electronics unit positioned in the interior space, operationally engaged to the lock unit, and being configured for communicating with the OBD device and an electronic device of a user, such that the electronics unit is enabled for selectively actuating the lock unit for unlocking the pin, wherein the electronics unit is configured for one or more of signaling the user of occupancy of the car seat when the vehicle has been turned off for a preset time, and for selectively actuating the lock unit for unlocking the pin.

2. The harness buckle locking assembly of claim 1, wherein the housing is substantially cuboid.

3. The harness buckle locking assembly of claim 1, wherein the lock unit comprises:
    a solenoid; and
    a piston operationally engaged to the solenoid, such that the solenoid is positioned for selectively retracting the piston from a recess in the pin for unlocking the pin.

4. The harness buckle locking assembly of claim 1, further including:
    a wall engaged to the housing and positioned in the interior space, the pin extending through a hole in the wall; and
    a spring positioned around the pin between the wall and the depressible button, wherein the spring is configured for compressing upon depressing of the depressible button, positioning the spring for rebounding upon release of the depressible button for retracting the pin into the housing.

5. The harness buckle locking assembly of claim 1, further including a plurality of clips attached to and extending from the rear facet of the housing, wherein the clips are configured for selectively and removably attaching the buckle of the harness.

6. The harness buckle locking assembly of claim 5, wherein:
    the housing is substantially cuboid; and
    the plurality of clips comprises four clips, each clip extending from proximate to a respective side of the rear facet.

7. The harness buckle locking assembly of claim 5, further including a plurality of channels extending into the rear facet of the housing, each clip being slidably positioned in a respective channel, such the clip is selectively extensible from the respective channel, wherein the plurality of clips is configured for attaching the housing to buckles having a variety of thicknesses.

8. The harness buckle locking assembly of claim 1, wherein the electronics unit comprises:
    a battery;
    a second transceiver configured for wireless communication with the electronic device of the user and the OBD device;
    a microprocessor operationally engaged to the battery, the second transceiver; and
    operations programming code positioned on the microprocessor enabling the microprocessor for:
        actuating the lock unit for unlocking the pin after a first preset time after the vehicle is in park and the ignition has turned off under normal working conditions, and
        actuating the lock unit for unlocking the pin after a second preset time (spec 30 seconds) after air bags of the vehicle have been deployed.

9. The harness buckle locking assembly of claim 8, further including a third transceiver operationally engaged to the microprocessor, the third transceiver being Global Positioning System enabled, wherein the third transceiver is configured for receiving coordinates of the housing for determining a location of the housing.

10. The harness buckle locking assembly of claim 8, further including communications programming code selectively positionable on the electronic device of the user enabling the electronic device for communicating with the electronics unit and for selecting sounding an alarm after communication between the second transceiver and the electronic device of the user has been lost or interrupted for a third preset time.

11. The harness buckle locking assembly of claim 10, further including the operations programming code enabling the microprocessor for actuating the lock unit for unlocking the pin after a fourth preset time after communication between the second transceiver and the electronic device of the user has been lost or interrupted.

12. A harness buckle locking system comprising:
    a vehicle comprising an On-Board Diagnostics (OBD) II port;
    a car seat secured to the vehicle;
    an OBD device comprising a first transceiver operationally engaged to the OBD II port;

a housing defining an interior space and selectively attached to a buckle of a harness of the car seat, such that the housing is positioned over a release button of the buckle;

a pin slidably attached to the housing and being selectively extensible from the interior space through a first orifice positioned in a rear facet of the housing;

a second orifice positioned in a front facet of the housing, a depressible button attached to the pin and extending into the second orifice, wherein the depressible button is configured for depressing for extending the pin from the housing for actuating the release button of the buckle;

a lock unit attached to the housing, positioned in the interior space, and operationally engaged to the pin, such that the pin is selectively lockable within the housing; and an electronics unit positioned in the interior space, operationally engaged to the lock unit, and being configured for communicating with the OBD device and an electronic device of a user, such that the electronics unit is enabled for selectively actuating the lock unit for unlocking the pin, wherein the electronics unit is configured for one or more of signaling the user of occupancy of the car seat when the vehicle has been turned off for a preset time, and for selectively actuating the lock unit for unlocking the pin.

13. A harness buckle locking assembly comprising:

an On-Board Diagnostics (OBD) device comprising a first transceiver and being configured for operationally engaging an OBD II port of a vehicle;

a housing defining an interior space and being configured for selectively attaching to a buckle of a harness engaged to a car seat secured to the vehicle, such that the housing is positioned over a release button of the buckle, the housing being substantially cuboid;

a pin slidably attached to the housing and being selectively extensible from the interior space through a first orifice positioned in a rear facet of the housing;

a second orifice positioned in a front facet of the housing;

a depressible button attached to the pin and extending into the second orifice, wherein the depressible button is configured for depressing for extending the pin from the housing for actuating the release button of the buckle;

a lock unit attached to the housing, positioned in the interior space, and operationally engaged to the pin, such that the pin is selectively lockable within the housing, the lock unit comprising:
 a solenoid, and
 a piston operationally engaged to the solenoid, such that the solenoid is positioned for selectively retracting the piston from a recess in the pin for unlocking the pin;

a wall engaged to the housing and positioned in the interior space, the pin extending through a hole in the wall;

a spring positioned around the pin between the wall and the depressible button, wherein the spring is configured for compressing upon depressing of the depressible button, positioning the spring for rebounding upon release of the depressible button for retracting the pin into the housing;

a plurality of clips attached to and extending from the rear facet of the housing, wherein the clips are configured for selectively and removably attaching the buckle of the harness, the plurality of clips comprising four clips, each clip extending from proximate to a respective side of the rear facet;

a plurality of channels extending into the rear facet of the housing, each clip being slidably positioned in a respective channel, such the clip is selectively extensible from the respective channel, wherein the plurality of clips is configured for attaching the housing to buckles having a variety of thicknesses;

an electronics unit positioned in the interior space, operationally engaged to the lock unit, and being configured for communicating with the OBD device and an electronic device of a user, such that the electronics unit is enabled for selectively actuating the lock unit for unlocking the pin, wherein the electronics unit is configured for one or more of signaling the user of occupancy of the car seat when the vehicle has been turned off for a preset time, and for selectively actuating the lock unit for unlocking the pin, the electronics unit comprising:
 a battery,
 a second transceiver configured for wireless communication with the electronic device of the user and the OBD device,
 a third transceiver, the third transceiver being Global Positioning System enabled, wherein the third transceiver is configured for receiving coordinates of the housing for determining a location of the housing,
 a microprocessor operationally engaged to the battery, the second transceiver, and the third transceiver,
 operations programming code positioned on the microprocessor enabling the microprocessor for:
  actuating the lock unit for unlocking the pin after a first preset time after the vehicle is in park and the ignition has turned off under normal working conditions, and
  actuating the lock unit for unlocking the pin after a second preset time after air bags of the vehicle have been deployed;

communications programming code selectively positionable on the electronic device of the user enabling the electronic device for communicating with the electronics unit and for selecting sounding an alarm after communication between the second transceiver and the electronic device of the user has been lost or interrupted for a third preset time; and the operations programming code enabling the microprocessor for actuating the lock unit for unlocking the pin after a fourth preset time after communication between the second transceiver and the electronic device of the user has been lost or interrupted.

\* \* \* \* \*